United States Patent [19]

Rehbein

[11] Patent Number: 4,745,947
[45] Date of Patent: May 24, 1988

[54] STEAM JACKETED OUTLET REDUCER NOZZLE

[75] Inventor: Richard E. Rehbein, Valparaiso, Ind.

[73] Assignee: Pullman Rail Leasing, Inc., Chicago, Ill.

[21] Appl. No.: 925,286

[22] Filed: Oct. 31, 1986

[51] Int. Cl.$^4$ .............................................. F16K 49/00
[52] U.S. Cl. ...................................... 137/340; 251/144
[58] Field of Search ........................ 251/144; 137/340; 105/358, 360

[56] References Cited

U.S. PATENT DOCUMENTS

| | | | |
|---|---|---|---|
| 3,656,710 | 4/1972 | Shaw | 251/144 |
| 4,234,158 | 11/1980 | Rollins et al. | 251/144 |
| 4,542,763 | 9/1985 | Gardner et al. | 137/340 |

Primary Examiner—A. Michael Chambers
Attorney, Agent, or Firm—Myers & Ehrlich, Ltd.

[57] ABSTRACT

A railway tank car having a wafer-type valve arrangement is provided with a nozzle member. The nozzle member has a mounting portion mounted on the valve arrangement. The mounting portion has an inlet opening therein which is large enough to receive a portion of the wafer valve when the valve is opened. A taper portion is formed integral with the mounting portion, and an outlet portion is formed integral with the taper portion. The outlet portion is smaller than the inlet opening and has securing means thereon for attachment to standard-sized connectors for unloading liquid or semi-liquid cargo. A breakage groove is provided in the nozzle member to protect the valve arrangement from impacts. A steam heating member with steam inlet and outlet means may be placed over the smaller outlet portion and secured to the nozzle member for heating cargo passing therethrough. The taper portion has an indentation therein to facilitate heating of cargo in the nozzle member. Access detents are provided in the steam heating member to allow insertion of bolts in the mounting portion for mounting the nozzle member on the valve arrangement.

22 Claims, 2 Drawing Sheets

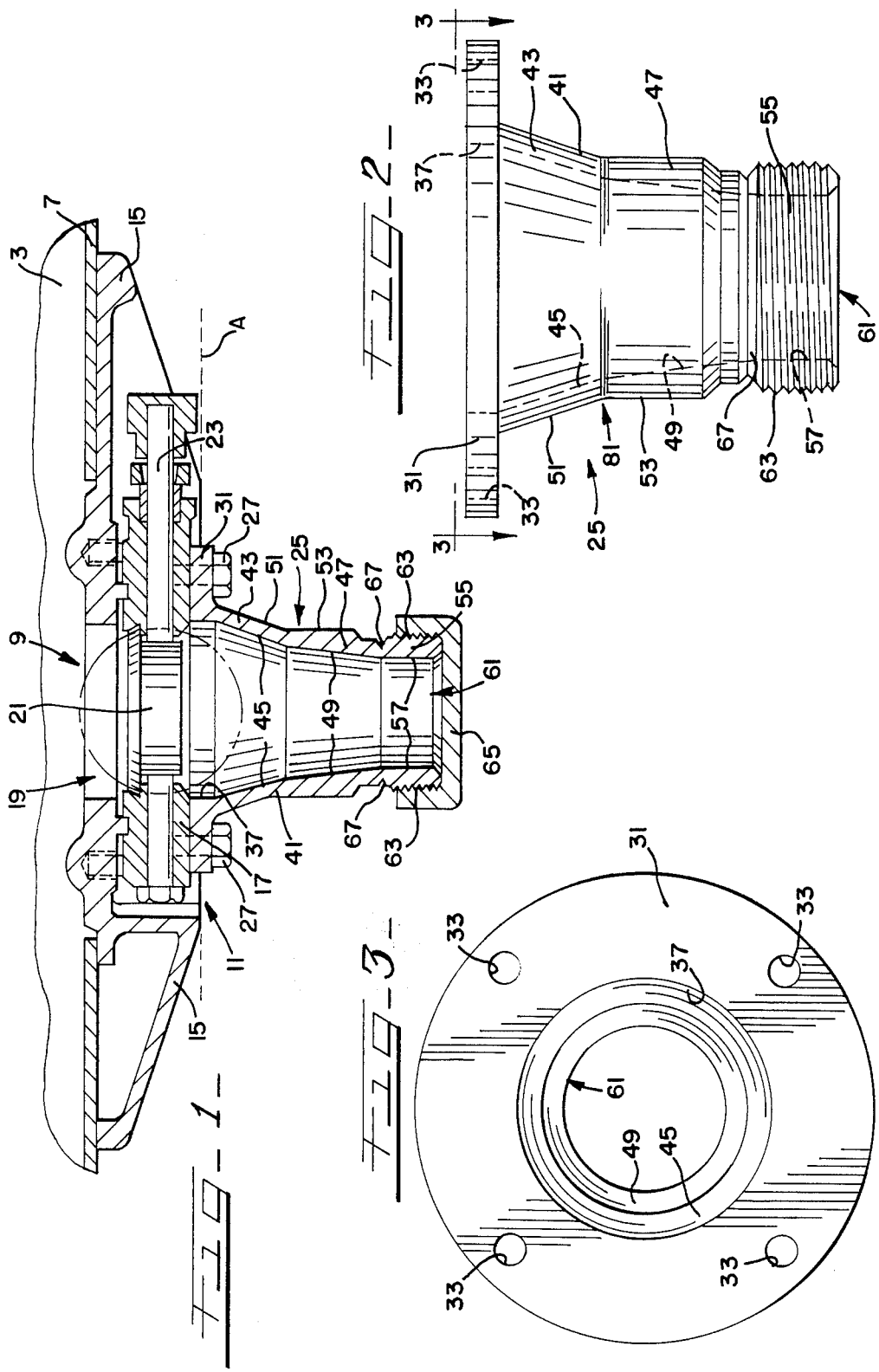

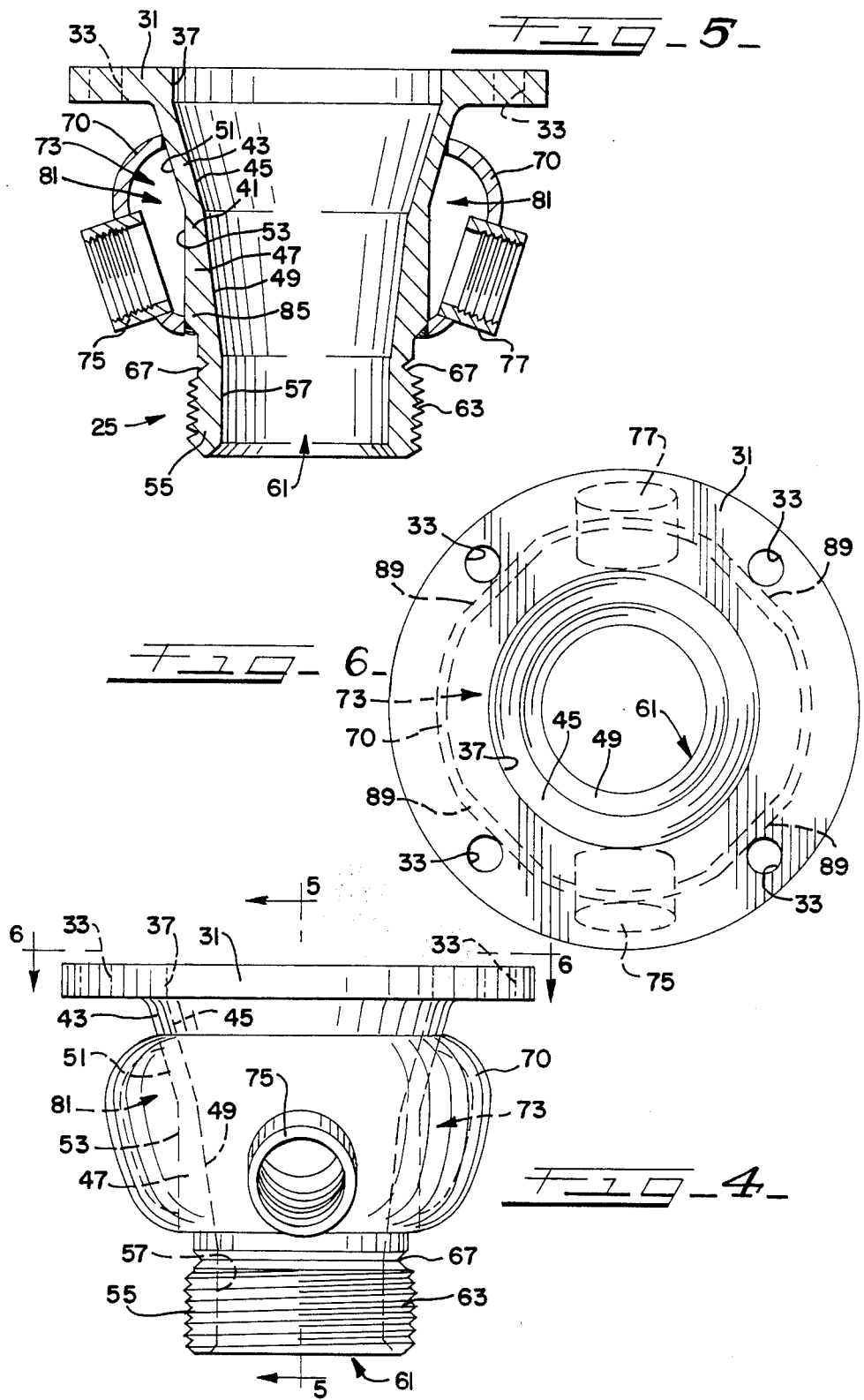

STEAM JACKETED OUTLET REDUCER NOZZLE

FIELD OF THE INVENTION

This invention relates to valve structures on railway tank cars for carrying various types of fluid or semifluid cargo. More particularly, this invention relates to an outlet reducer nozzle for connection to a valve structure on a railway tank car for improved unloading of the contents of the railway tank car.

DESCRIPTION OF THE PRIOR ART

It is known in the prior art to provide a railway tank car with a valve structure selectively sealing and opening an outlet opening in the bottom of the railway car. A number of types of valves have been developed. One design of valve is the wafer type valve wherein a valve structure has a pivotally-mounted generally circular valve plate. The valve plate is connected with a handle, allowing an operator to manually rotate the valve plate from a horizontal closed position to a vertical open position. An advantage of this design is that it provides a low profile valve when the valve is closed because the valve plate is horizontal adjacent the bottom of the railway tank car. A disadvantage of this design is that to provide for adequate flow of lading from within the tank car, the valve opening must be relatively large, necessitating a correspondingly large wafer valve plate. This produces difficulty in connections to smaller standard-sized connections and cargo withdrawing mechanisms which are sized in smaller diameters. The usual approach to make a connection between the relatively larger wafer type valve and a smaller standard-sized off loading device has been to attach a cylindrical spacer to the bottom of the valve. This spacer had an inner radius large enough to allow the wafer valve plate to pivot and uncover the valve opening. A standard-sized connector was bolted to the bottom of the spacer, allowing withdrawal of the lading through the valve but providing an arrangement which was difficult to install, was not particularly suited to provide good flow of cargo through the nozzle, and was generally considerably longer than required by the American Association of Railroads (AAR) requirements. The spacer was supplied with steam to warm the cargo passing through the valve, but the cylindrical spacer had contact with cargo only at its inner diameter, which was large to accommodate the valve plate, and therefore was not as efficient as possible for heating the contents of the car passing through the spacer.

SUMMARY OF THE INVENTION

A railway tank car has an interior and is provided with an opening communicating with the interior. A valve structure is mounted on the tank car for selectively covering and uncovering the opening for withdrawing lading from within the railway tank car. The valve structure has a valve member or disc which is movably supported for movement with respect to the opening to cover and uncover the opening. When the valve member is moved to uncover the opening, it extends outwardly of the car beyond the valve structure. A nozzle member is supported on the valve structure and includes a mounting portion mounted on the valve structure. The mounting portion has an inlet opening communicating with the valve opening. The inlet opening is large enough to receive the valve member when the valve member is moved into the valve open position. A taper portion is formed integral with the mounting portion and extends away from the car. The taper portion has a space therein communicating with the inlet opening. An outlet portion is formed integral with the taper portion and has an outlet opening smaller than the inlet opening. The outlet opening communicates with the space in the taper portion whereby the contents of the railway car pass through the valve means and the nozzle member to be removed from the car. The outlet portion has securing means for connecting the outlet portion to a receiving means for receiving the contents of the car passing through the nozzle member.

A steam heating coil is connected with the nozzle member and forms a steam heating space around the nozzle member for heating the lading passing through the nozzle member to facilitate flow of the lading. The mounting portion of the nozzle member has attachment apertures, and bolts extend through the attachment apertures to secure the mounting portion to the valve structure. The steam coil has detents therein substantially aligned with the attachment apertures which provide access to the apertures for placement of the bolts.

The taper portion of the nozzle member includes two taper segment portions formed integral with the mounting portion. The taper segment portions are angled with respect to each other to produce an indentation in the outer surface of the nozzle member. The indentation provides for increased volume of the heating space defined by the heating coil and produces a heating space of a shape which facilitates circulation of steam about the nozzle member for heating the lading therein. A breakage groove is provided in the nozzle member which permits the lower portion of the nozzle member to break away in the event of an impact. The breakage groove is located approximately 6½ inches from the surface of the railway tank car.

The valve member used in the preferred embodiment is a wafer type valve structure. The wafer valve member is generally circular in shape and has an inside diameter of approximately 6 inches. The inlet opening of the nozzle member is also circular in shape and has an inside diameter of approximately 6 inches for receiving a portion of the valve member when the valve member is pivoted to uncover the opening. The outlet portion is generally cylindrical and has an outer diameter of approximately 5¼ inches for connection to standard size fittings.

BRIEF DESCRIPTION OF THE DRAWINGS

FIG. 1 is a cross sectional view through the longitudinal centerline of a wafer valve structure with the outlet reducer nozzle member of this invention.

FIG. 2 shows an elevational view of the nozzle member.

FIG. 3 shows a view taken along line 3—3 of FIG. 2 showing the mounting portion of the nozzle.

FIG. 4 shows an elevational view of a nozzle member of this invention having a steam coil mounted thereon.

FIG. 5 is a section view taken along line 5—5 of FIG. 4.

FIG. 6 is a view taken along line 6—6 of FIG. 4.

DETAILED DESCRIPTION OF THE DISCLOSURE

As best shown in FIG. 1 a railroad tank car body 3 has a bottom 7. The bottom 7 has an opening therein generally designated at 9. The opening 9 is covered by a valve arrangement generally designated at 11. The valve arrangement 11 includes a protective flange 15 surrounding a valve structure 17. The protective flange 15 protects the valve arrangement 11 down to the shear plane indicated at A, by deflecting impacts which would otherwise potentially damage the valve structure 17. In th event of an impact, nozzle member 25 will shear away bolts 27 and separate from the bottom surface of the valve arrangement 11 at a shear plane slightly above shear plane A.

The valve structure 17 has a valve opening therein generally designated at 19 which communicates with the opening 9 in the bottom 7 of the railway car 3. This valve opening 19 is selectively covered and uncovered by valve member 21 which is supported on operating rod 23. Operating rod 23 is equipped with a handle (not shown) which may be rotated by an operator to rotate the valve member 21 from the valve closed position shown in FIG. 1 to the valve open position shown in phantom in FIG. 1.

Nozzle member 25 is mounted to the undersurface of valve structure 17 by attachment members in the form of bolts 27. As best shown in FIGS. 1,2, and 3, the nozzle member 25 has a mounting portion 31. Mounting portion 31 is generally circular and has a plurality of attachment aperture means in the form of generally circular openings 33 in the mounting portion 31. Bolts 27 (FIG. 1) extend generally vertically through openings 33 to be secured in the valve structure 17.

The mounting portion 31 has an inlet opening 37 therein. The inlet opening 37 is substantially the same diameter as the valve member 21 and is therefore large enough to receive a portion of the valve member 21 therein when the valve member 21 is turned to the valve open position, shown in phantom in FIG. 1.

A taper portion 41 is formed integral with the mounting portion 31 and extends away from the valve structure 17. The taper portion 41 includes a first taper segment portion 43 which is formed integral with the mounting portion 31. First taper portion 43 has an inner taper surface 45 which defines a first generally conical interior tapering space. A second taper segment portion 47 is formed integral with the first segment taper portion 43 and extends downwardly therefrom. Second taper segment portion 47 has an inner surface 49 which defines a second generally conical interior space within the nozzle member 25. First taper portion 43 has an exterior surface 51 and second taper segment portion 47 has an exterior surface 53.

The conical interior space defined by surface 45 of first taper segment portion 43 communicates at its widest point with inlet opening 37. At this point the interior surface 45 is substantially the same size as the opening 37 and the taper of inner taper surface 45 is gradual enough to permit valve member 21 to project into the first interior space. At the lower end of the space defined by surface 45, the space communicates with the space defined by surface 49 and at this point the surfaces 45 and 49 are substantially the same size to provide for smooth flow of lading through the nozzle member 25.

Conical surface 45 is angled away from the centerline which is the center of the cone circumscribed by surface 45 at an angle of 17½ degrees. Conical surface 49 is angled back from the centerline of the cone circumscribed thereby at an angle of 7½ degrees, producing a two-stage taper which narrows the size of the space within the nozzle member 25 from a diameter of approximately 6 inches in opening 37 to a diameter of approximately 3¾ inches at the lower end of conical surface 49.

Taper segment portion 47 is connected at its lower end with outlet portion 55. Outlet portion 55 has an inner surface 57 defining a generally cylindrical space therein communicating with the spaces formed by conical surfaces 49 and 45 and inlet opening 37. The space defined by surface 57 also communicates with the external environment, providing an outlet opening generally indicated at 61 in outlet portion 55. The diameter of thepace defined by surface 57 is approximately 3¾ inches in diameter. The outer surface of outlet portion 55 is provided with securing means in the form of threaded engaging means 63 for securing the nozzle portion to a cap 65 as shown in FIG. 1 for additionally securing the seal on the tank car, or to receiving means in the form of conduits which are removably connected to the nozzle member 25 for unloading cargo from the interior of the tank car through the valve structure 17, through the nozzle member, and to the receiving means. The outer diameter of outlet portion 55 is approximately 5¼ inches and this is provided with threading of 4 threads per inch. This is a size compatible with standard sizes of conduit connections of receiving means used throughout the industry.

Nozzle member 25 is provided with a breakage groove 67 which extends around the nozzle member 25 at a distance of approximately 6½ inches from the valve structure 17. The breakage groove 67 is provided in accordance with the AAR specifications to provide for structure below the breakage groove 67 to break away in the event of an impact on the structure below the breakage groove 67. This serves to protect the valve arrangement 11 from being damaged in case of an impact.

With reference to FIGS. 4, 5, and 6, the nozzle member 25 is shown equipped with a steam heating member or steam coil member 70. As shown in FIG. 5, steam heating member 70 defines a space generally indicated at 73 between the outer surfaces 51 and 53 of first and second taper segment portions 43 and 47. The steam heating member 70 is provided with steam inlet means 75 and steam outlet means 77 which are connected to an external source of heated steam. When steam is introduced into inlet 75 into space 73 the steam circulates about through the space 70 surrounding the nozzle member 75 and transferring heat to the lading passing through the nozzle member 25. The inlet and outlet means 75 and 77 are situated towards the lower end of the steam heating member 70 to facilitate the draining of any condensed water accumulating in the space 70. The outer surfaces 51 and 53 of taper segment portions 43 and 47 are angularly disposed with respect to each other to provide an indentation or concavity generally indicated at 81 extending around the nozzle member. This indentation produces increased volume inside the space 73 within the heating member 70, and also results in greater heated surface area in contact with the cargo in the interior of the nozzle member 25 for transferring heat from the steam heating space 73 to the cargo as it passes through the nozzle member 25. The indentation allows for a relatively compact steam jacketed nozzle arrangement with efficient transfer of heat from the steam coil to the lading within the nozzle member 25.

As best shown in FIG. 5, steam heating member 70 is welded to an upper portion of the nozzle taper portion 41, and to an abutment shoulder 85 on the second taper segment portion 47.

As best shown in FIG. 6, the steam heating member 70 is provided with detents or detent portions 89 which provide clearance spaces substantially vertically aligned below the attachment openings 33 in the mounting portion 31. The presence of detent portions 89 permits ready installation and removal of attachment members such as bolts 27 which extend through openings 33 to secure the mounting portion 31 to the valve structure 17.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. An outlet for a railway tank car body having an interior adapted to receive and carry cargo, said tank car body having an opening therein communicating with the interior thereof, said outlet comprising:
    a valve structure mounted on the tank car body for selectively covering and uncovering the opening;
    the valve structure including a valve member movable supported on the valve structure for movement with respect to the opening for the selective covering and uncovering thereof;
    said valve member extending outwardly of the car beyond the valve structure when moved to uncover the opening;
    a nozzle member supported on the valve structure and comprising:
    a mounting portion mounted on the valve structure;
    said mounting portion having an inlet opening therein communicating with the opening, said inlet opening being large enough to receive the valve member therein when the valve member is moved to uncover the opening;
    a taper portion formed integral with the mounting portion and extending away from the car, said taper portion having a space therein communicating with the inlet opening;
    an outlet portion formed integral with the taper portion and having an outlet opeing smaller thant he inlet opening, said outlet opening communicating with the space in the taper portion whereby the contents of the railway car pass through the valve means and the nozzle member to be removed from the car;
    said outlet portion including securing means for connecting the outlet portion to a receiving means for receiving the contents of the car passing through the nozzle member whereby standard-sized receiving means adapted for connection to an outlet smaller than the valve member may be used to receive cargo from said car through said valve structure; and
    said taper portion including a first taper segment portion formed integral with the mounting portion and a second taper segment portion connected with the first taper segment portion;
    said first and second taper segment portions being disposed with respect to each other to produce an indentation inwardly of the nozzle member in the outer surface portion of the nozzle member; and
    a steam heating member connected with the nozzle member, said steam heating member having an inner surface portion and each of the taper segment portions having an outer surface portion, said inner surface portion of said steam heating member and said outer surface portions of said first and second taper segment portion defining a steam heating space therebetween;
    steam inlet means and steam outlet means being connected with the steam heating member for introducing steam into said steam heating space to facilitate passage of congealable contents the car through said nozzle member by heating said contents in the nozzle member.

2. The invention according to claim 1 and
    the valve member being pivotally supported on the valve structure.

3. The invention according to claim 1 and
    the valve member being generally circular in shape and having a diameter of approximately six inches.

4. The invention according to claim 3 and
    said inlet opening being generally circular in shape and having a diameter of approximately six inches for receiving a portion of said valve member when the valve member is moved to uncover the opening.

5. The invention according to claim 4 and
    said outlet portion being generally cylindrical and having an outer diameter of approximately 5.2 inches for connection to standard-sized fittings.

6. The invention according to claim 1 and
    the nozzle member having a breakage groove therein to permit a portion of the nozzle member to break away in the event of an impact thereon.

7. The invention according to claim 6 and
    said breakage groove being located approximately six-and-one-half inches from the surface of the railway tank car.

8. The invention according to claim 1 and
    said inlet opening, said space within the taper portion, and the outlet opening being substantially circular in cross sections taken perpendicular to the direction of extension of the nozzle member.

9. The invention according to claim 1 and
    said mounting portion having attachment aperture means;
    attachment means extending through said attachment aperture means and engaging said valve structure for securing the mounting portion thereto;
    said attachment means being adapted to permit the nozzle member to break away from the valve structure in the event of an impact.

10. An outlet for a railway tank car having an interior adapted to receive and carry lading, said tank car having an opening therein communicating with the interior, said outlet comprising:
    a valve structure mounted on the tank car for selectively covering and uncovering the opening;
    the valve structure including a valve member movably supported on the valve structure for movement with respect to the opening for the selective covering and uncovering thereof;
    said valve member extending of the car beyond the valve structure when moved to uncover the opening;
    a nozzle member supported on the valve structure and comprising:
    a mounting portion mounted on the valve structure;
    said mounting portion having an inlet opening therein communicating with the opening, said inlet opening being large enough to receive the valve member therein when the valve member is moved to uncover the opening;

a taper portion formed integral with the mounting portion and extending away from the car, said taper portion having a space therein communicating with the inlet opening;

an outlet portion formed integral with the taper portion and having an outlet opening smaller than the inlet opening, said outlet opening communicating with the space in the taper portion whereby the contents of the railway car pass through the valve means and the nozzle member to be removed from the car;

said outlet portion including securing means for connecting the outlet portion to a receiving means for receiving the contents of the car passing through the nozzle member; and a steam heating member connected with the nozzle member, said steam heating member having an inner surface portion and said nozzle member having an outer surface portion, said inner surface portion of said steam heating member and said outer surface of said nozzle member defining a steam heating space therebetween;

steam inlet means and steam outlet means being connected with the steam heating member for introducing steam into said steam heating space to facilitate passage of congealable contents of the car through said nozzle member by heating said contents in the nozzle member; and said steam heating member having first and second aperture means therein adjacent the inner surface portion thereof, said aperture means receiving the nozzle member therein whereby said steam heating space is closed to the surrounding environment, and the only access to said seam heating space is through said steam inlet and outlet means;

said outlet portion being small enough to pass through said first and second aperture means; and means for securing said steam member to said nozzle member whereby the nozzle member may be provided with steam heating by passing the steam heating member over the outlet portion and securing said steam heating member to said nozzle member.

11. The invention according to claim 10 and said mounting portion having attachment aperture means;

attachment means extending through said attachment aperture means and engaging said valve structure for securing the mounting portion thereto.

12. The invention according to claim 11 and said steam heating member having a detent therein substantially aligned with the attachment aperture means to provide access to the attachment aperture means for placement and removal of the attachment means therein.

13. The invention according to claim 10 and said taper portion including a first taper segment portion formed integral with the mounting portion and a second taper segment portion connected with the first taper segment portion;

said first and second taper segment portions being disposed with respect to each other to produce an indentation inwardly of the nozzle member in the outer surface portion of the nozzle member;

said indentation providing increased volume of the steam heating space to facilitate circulation of steam within said steam heating space for heating said nozzle member, and said indentation and relative disposition of said first and second taper segment portions providing added surface area in said taper portion for enhancing heating of the contents of the car passing through the nozzle member.

14. The invention according to claim 10 and the nozzle member having a breakage groove therein to permit a portion of the nozzle member to break away in the event of an impact thereon; and said steam heating member being located between said mounting portion and said breakage groove.

15. The invention according to claim 14 and said breakage groove being located approximately six-and-one-half inches from the surface of the railway tank car.

16. The invention according to claim 10 and said nozzle member having a shoulder portion thereon for welding the steam heating member to the nozzle member.

17. The invention according to claim 10 and said inlet opening, said space within the taper portion, and said outlet opening being substantially circular in cross sections taken perpendicular to the direction of extension of the nozzle member.

18. The invention according to claim 10 and the valve member being generally circular in shape and having a diameter of approximately six inches;

said inlet opening being generally circular in shape and having a diameter of approximately six inches for receiving a portion of said valve member when the valve member is moved to uncover the opening.

19. The invention according to claim 18 and said outlet portion being generally cylindrical and having an outer diameter of approximately 5.2 inches for connection to standard-sized fittings.

20. The invention according to claim 10, and said nozzle member and said steam heating member each being formed by extrusion.

21. An outlet for railway tank car having an interior adapted to receive and carry lading, said tank car having an opening therein communicating with the interior, said outlet comprising:

a valve structure mounted on the tank car body for selectively covering and uncovering the opening;

the valve structure including a valve member movably supported on the valve structure for movement with respect to the opening for the selective covering and uncovering thereof;

said valve member extending outwardly of the car beyond the valve structure when moved to uncover the opening;

a nozzle member supported on the valve structure and comprising:

a mounting portion mounted on the valve structure;

said mounting portion having an inlet opening therein communicating with the opening, said inlet opening being large enough to receive the valve member therein when the valve member is moved to uncover the opening;

a taper portion formed integral with the mounting portion and extending away from the car, said taper portion having a space therein communicating with the inlet opening;

an outlet portion formed integral with the taper portion and having an outlet opening smaller than the inlet opening, said outlet opening communicating with the space in the taper portion whereby the contents of the railway car pass through the valve means and the nozzle member to be removed from the car;

said outlet portion including securing means for connecting the outlet portion to a receiving means for receiving the contents of the car passing through the nozzle member; and a steam heating member connected with the nozzle member, said steam heating member having an inner surface portion and said nozzle member having an outet surface portion, said inner surface portion of said steam heating member and said outer surface of said nozzle member defining a steam heating space therebetween; steam inlet means and steam outlet means being connected with the steam heating member for introducing steam into said steam heating space to facilitate passage of congealable contents of the car through said nozzle member by heating said contents in the nozzle member; and said steam inlet means and said steam outlet means being disposed symemtrically on the steam heating member whereby said steam inlet and outlet means may be used interchangeably.

22. The invention according to claim 21, and the steam inlet and outlet means each being angulated generally away from the tank car to facilitate operator connection of steam supply lines thereto.

* * * * *